United States Patent
Bruno

(10) Patent No.: US 9,908,366 B2
(45) Date of Patent: Mar. 6, 2018

(54) PIVOT FOR CASTOR WHEELS FOR CLEANING EQUIPMENT AND THE LIKE

(71) Applicant: FILMOP S.R.L., Villa del Conte (IT)

(72) Inventor: Zorzo Bruno, Villa del Conte (IT)

(73) Assignee: Filmop International s.r.l., Villa del Conte (IT)

( * ) Notice: Subject to any disclaimer, the term of this patent is extended or adjusted under 35 U.S.C. 154(b) by 0 days.

(21) Appl. No.: 14/817,796

(22) Filed: Aug. 4, 2015

(65) Prior Publication Data

US 2016/0031264 A1 Feb. 4, 2016

(30) Foreign Application Priority Data

Aug. 4, 2014 (IT) .............................. PD2014A0215

(51) Int. Cl.
B60B 33/00 (2006.01)
B60B 5/02 (2006.01)

(52) U.S. Cl.
CPC ............ *B60B 33/0065* (2013.01); *B60B 5/02* (2013.01); *B60B 33/00* (2013.01); *B60B 33/006* (2013.01); *B60B 33/0021* (2013.01); *B60B 33/0068* (2013.01); B60B 33/0049 (2013.01); B60B 33/0057 (2013.01); B60B 2200/20 (2013.01); B60B 2900/141 (2013.01); B60B 2900/212 (2013.01); B60B 2900/321 (2013.01); B60B 2900/325 (2013.01); B60B 2900/351 (2013.01); B60B 2900/721 (2013.01); B60B 2900/931 (2013.01); *Y10T 16/202* (2015.01)

(58) Field of Classification Search
CPC ... Y10T 16/199; Y10T 16/201; Y10T 16/202; Y10T 16/557; Y10T 16/186; B60B 33/0065; B60B 33/006; B60B 33/0021; B60B 33/00; B60B 33/0068; B60B 33/0057; B60B 33/0049; B60B 5/02; B60B 2900/212; B60B 2900/325; B60B 2900/931; B60B 2900/721; B60B 2900/141; B60B 2900/321; B60B 2900/351; B60B 2220/20
USPC ......................................... 16/37–39, 386, 20
See application file for complete search history.

(56) References Cited

U.S. PATENT DOCUMENTS

| | | | | |
|---|---|---|---|---|
| 3,197,802 A * | 8/1965 | Fontana | ............. | B60B 33/0002 16/38 |
| 3,230,575 A * | 1/1966 | Schultz, Jr. | ......... | B60B 33/0002 16/38 |
| 3,718,942 A * | 3/1973 | Arenson | ................. | B60B 33/00 16/37 |
| 3,755,852 A * | 9/1973 | Greene | ................... | F16B 21/10 16/37 |
| 4,120,071 A * | 10/1978 | Crescenzi | ........... | B60B 33/0028 16/37 |
| 4,720,894 A * | 1/1988 | Deasy | ................. | B60B 33/0002 16/37 |
| 4,793,021 A * | 12/1988 | Deasy | ................. | B60B 33/0002 16/273 |

(Continued)

*Primary Examiner* — William Miller
(74) *Attorney, Agent, or Firm* — QuickPatents; Kevin Prince

(57) ABSTRACT

The pivot for castor wheel for cleaning equipment or the like, with new elements structured to absorb and counteract the stresses to which the wheel is generally subjected during use, allows cleaning equipment and the like to be used in areas and sectors compatible with the materials used for the various parts that compose it.

10 Claims, 2 Drawing Sheets

(56) References Cited

U.S. PATENT DOCUMENTS

| | | |
|---|---|---|
| 5,181,587 A | 1/1993 | Masatoshi |
| 8,661,615 B1 * | 3/2014 | Li .................... B60B 33/001 16/18 R |
| 2010/0107361 A1 | 5/2010 | Yang |

* cited by examiner

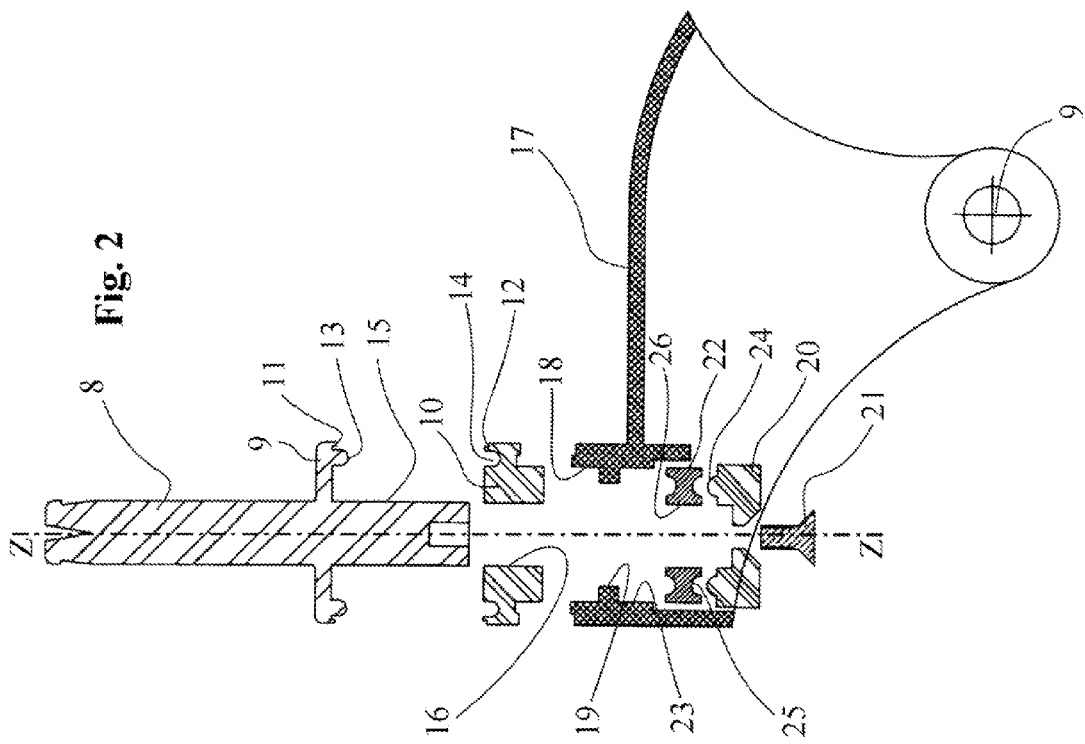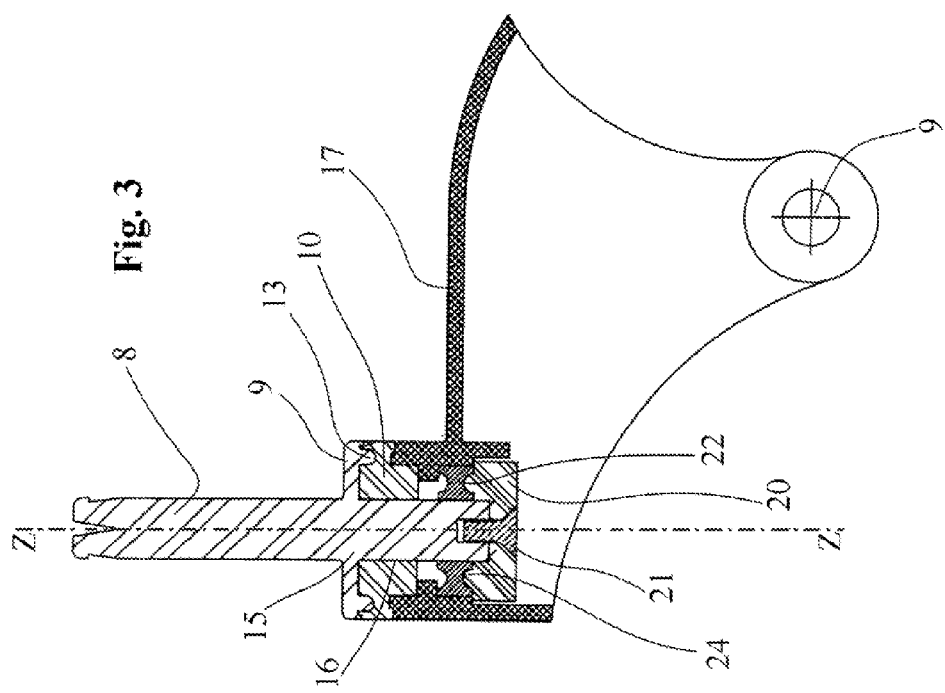

PIVOT FOR CASTOR WHEELS FOR CLEANING EQUIPMENT AND THE LIKE

CROSS-REFERENCE TO RELATED APPLICATIONS

This application claims the benefit of Italian Patent Application PD2014A000215, filed on Aug. 4, 2014, and incorporated herein by reference.

STATEMENT REGARDING FEDERALLY SPONSORED RESEARCH AND DEVELOPMENT

Not Applicable.

FIELD OF THE INVENTION

The field of this invention concerns revolving wheels or pivoting wheels that accessorize equipment in the cleaning industry.

DISCUSSION OF RELATED ART

The wheels that can be found on the various trolleys or similar equipment used in the cleaning industry are well known.

Equally well known is the requirement that the above-mentioned wheels are of the pivoting variety (otherwise known as swivel or castor wheels)

Castor wheels for equipping trolleys, or similar equipment, in the cleaning industry have a pivot that protrudes with respect to the main axis of the rotating wheel, so that it allows the wheel itself to rotate around the axis of the pivot, thereby allowing the direction of the carriage to change when moved.

Said pivot is supported at the top on a structure that laterally embraces, slightly offset, the castor wheel; the axis of the castor wheel is fixed at the bottom of the pivot's support structure.

Therefore the two axes, that of the rotating pivot and that of the wheel are arranged in an orthogonal manner.

Because of their sturdiness and their reliability, these wheels have become a market standard, used in a variety of situations, including the cleaning sector.

Now in the field of professional cleaning, the wheels, like most of the components, need to meet numerous other requisites in addition to sturdiness and reliability: in particular, they need to be adapted for use in particular environments where there are aggressive chemicals, they need to be affordable, they need to be light, an aspect that is commensurate with a load resistance value.

To satisfy these stringent requisites, the above-mentioned commonly-used wheels are fitted with bearings with a plastic casing.

Generally there is a top bearing and a bottom bearing, inserted into their respective housings in the castor casing and crossed by the pivot of the stem of the wheel.

Said pivot is metallic and has a collar that hits the internal ring of the top bearing that acts therefore also as a thrust bearing.

Possibly, the bearing is protected at the top by a dust cover or else the bearing itself can be shrouded.

In any case, the moments of the wheel stem are opportunely absorbed, and therefore countered by the top bearing and distributed over the entire housing of the bearing itself of the wheel casing.

It should be noted that for economic and production reasons the wheel casing is a simple product molded with a plastic material without any wear-resistant function.

It is evident that in the constructive structure of a wheel with an overhanging rotating pivot, not to use the top bearing would compromise the performance of the wheel itself quite quickly. In fact, the friction and wear act at that point of the housings to render the wheel no longer capable of carrying out a fluid and continuous rotation around itself.

The presence of the bottom bearing is equally essential, and only by taking appropriate measures can it be omitted, in particular using a very thick top bearing.

In fact with a very thick top bearing, the lower part of the stem needs to be retained because of its movements due to the rotation torque (due to the fact that the stem is cantilevered on the support) with a stop that has marginal pressures.

Therefore this lower part of the pivot can rest directly on the casing, without carrying out any action on it. The bottom part of the pivot, which protrudes from the casing, is therefore only used for being equipped with devices that prevent any extraction or disjuncture of the casing.

For this reason, the bottom of the pivot generally has a housing for a Seeger washer to prevent any extraction.

The use of a Seeger washer is possible because the relative housing is made with a cavity on a metallic material.

There remains the circumstance that the use of these wheels in the ambit of the cleaning sector is not optimal, since the metallic part of said wheels, when there are cleaning liquids, detergents, acids and aggressive agents, soon leads to the wheels themselves not being suited to purpose.

Said trolleys, moreover, since they can access places like kitchens or canteens that are notoriously difficult to clean properly, even just because of the metallic wheels that rust, need to be periodically changed.

The same can be said for health facilities, where the cleaning, in addition to needing to look clean, also needs to be hygienic.

In the ambit of these health facilities, lastly, said metallic wheels can be an insurmountable problem also when they are new, like for example those areas where diagnostics require the absence of magnetic fields.

Evidently, even just a small metallic part would compromise the use of these trolleys in these delicate areas, with minimum or no magnetic interference, falsifying any diagnostic exams when these trolleys are placed near equipment that is particularly sensitive to outside and extraneous magnetic fields.

In these areas, then, before working it is necessary to shift all the cleaning trolleys, or other devices with metallic wheels, far away or into another department.

We should not even think that a simple replacement of the materials can solve the problem, since there are no non-metallic materials that can absorb and counter the extremely high localized stress.

Another drawback of the metallic wheels regards their weight.

Very often, the same stem needs to be covered with a plastic sleeve both to diminish the weight and the cost of the material, and also to provide the stem with an elastic element that can retain, after overcoming an initial interference, the wheel inside its housing underneath the device.

PURPOSE OF THE INVENTION

A primary objective is to have a wheel for a cleaning trolley or similar equipment for the cleaning sector and the like, of the variety usually known as a castor wheel, with a side stem that does not have the above-mentioned drawbacks.

Another object of the invention is to make available a wheel that can be used in sensitive areas, either because of the sanitary aspect or the aspect of interference, without any drawbacks.

A further object of the invention is to make available a wheel that can be durable, with low friction and minimum wear when used.

Yet another object of the present invention is to provide a wheel whose various elements can be easily maintained and/or replaced.

An important object of the present invention is to provide a wheel that can withstand the stresses of the weights and moments in the same way as the metallic ones on the market.

An essential object of the present invention is to provide a wheel that can overcome the drawbacks due to its structure and its materials in the various areas of the ambit of premises with stringent demands for cleanliness, hygiene, and magnetic compatibility.

SUMMARY OF THE INVENTION

All the aforesaid objects and others which will become clearer below in the description are achieved by a wheel with a stem of the cantilevered pivot made of a plastic/resinous material, where said pivot is connected solidly to a collar which rests on a ring nut made of a wear-resistant material housed inside a first seat on the top of the casing.

Conveniently, said pin is retained at the bottom by a flange that rests on a ring housed inside a second lower seat of the casing.

ADVANTAGEOUS FEATURES OF THE INVENTION

Advantageously, said collar and the part of the ring nut facing said collar are profiled to not only support the load transmitted from the pivot of the stem of the wheel, but also to absorb and counteract the relative bending moments, avoiding that the part of the pivot that crosses said ring nut must bear all the tilting moment, which would lead to the material having an unacceptable stress value.

Very usefully also, in order to avoid that in the facing surfaces between the collar and ring nut dirt or dust or other pollutants could enter, on the circumferential edge perimeter there are one or more coaxial and concentric lips which create a labyrinth that is difficult to overcome for all elements that cause wear, keeping these facing surfaces clean without dirt that could cause wear or friction during the reciprocal movement of the collar on its ring nut.

It is very important that the ring nut is retained within an upper seat of the casing that is sufficiently large and dimensioned in such a way that the specific localized stresses are acceptable also for the plastic material of which generally said casing is made, without requiring expensive molding for specifically quality materials.

The lower part of the pivot must be properly confined in order to prevent slippage of the pivot during use. However, the plastic material of which the pivot is made in this case does not allow any specific localized stress of high tension.

Advantageously, therefore, the end part of the pivot is joined to a flange, preferably made of anti-friction material that distributes the stresses on a ring encased within a special housing in the lower part and inside the casing.

Also in this case, to avoid the moments triggered by the cantilever of the pivot with respect to the support point being absorbed and counteracted only by the pair of upper collar-ring nut elements, part of these moments is countered by the flange-ring nut.

In fact, by suitably shaping the flange and the ring you prevent the lower part of the pivot countering alone the whole part of the moment that is not absorbed and countered by the upper elements collar-ring nut.

Very likely it is to be preferred that the collar-ring nut pair and the flange-ring nut pair are configured with a pronounced curved or semi-circular raised part that flows within a respective housing; said raised part and said housing are preferably located on the outside of the respective elements like circular crowns.

And particularly useful is the configuration and arrangement of all the various lips which prevent the ingress of liquids or other dirt keeping the inside of the elements of the vertical rotation of the wheel clean and therefore providing a long life without necessary maintenance operations.

This wheel, equipped and structured according to the invention, has all elements for the vertical rotation without any metallic element.

In combination with a wheel rotation, also plastic and/or rubbery, supported on a nom-metallic pivot supported in the housings of the casing, achieves a major aim of the invention, that of a functional wheel with a pivot of the projecting stem of the pivoting variety made completely of plastic without any metal parts.

In this way the wheel that is the object of the invention can in no way be affected by all these drawbacks that plague current wheels on the market with one or more metal parts: wear, friction due to deterioration, rust, the presence of magnetic fields, etc.

In particular, this wheel, in conjunction with the instruments and tools, like trolleys or wheeled buckets that are completely made of plastic, can freely move around and operate in all types of environments, such as those in which the presence of metals would compromise the result, which require constant care and vigilance regarding the presence of extraneous magnetic fields.

These and other objects are all achieved by the wheel of this invention according to the attached claims.

DESCRIPTION OF THE DRAWINGS

The technical characteristics of the invention, according to the aforesaid aims, are clearly noted in the content of the claims reported below, and its advantages will become more readily apparent in the detailed description that follows, made with reference to the accompanying drawings, which illustrate a preferred embodiment, purely exemplary and not limiting, in which:

FIG. 2 shows a vertical section of the various components of the wheel of the invention arranged in exploded manner; and FIG. 3 shows the object of FIG. 2 assembled.

DETAILED DESCRIPTION OF THE PREFERRED EMBODIMENT

Figure 1:
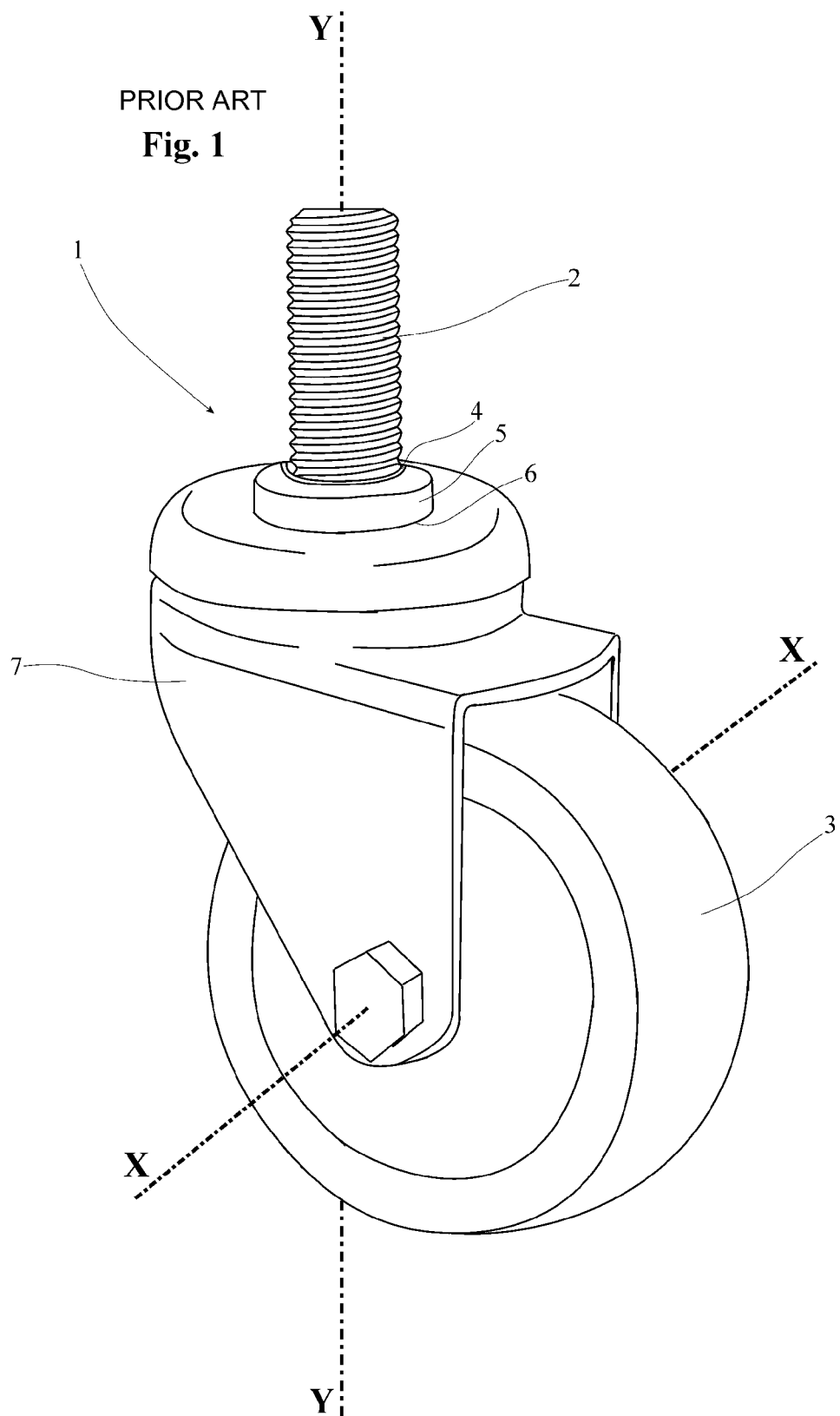
FIG. 1 shows a common castor wheel with metallic bearings that support a metal pivot.

With reference to the figures, we see that a traditional pivoting or revolving wheel 1 has a pivot 2 whose vertical axis of rotation Y-Y is perpendicular and is cantilevered with respect to the main axis of rotation X-X of the rotating wheel 3.

All the forces transmitted from the equipment or devices above are applied to the pivot 2.

Said pivot 2 is usually fitted with a collar abutment 4. Said collar 4 rests on the inner ring of an underlying ball bearing 5 arranged within a housing 6 specially crafted in the support structure 7 of the castor wheel 3.

Said support structure 7 is usually also made of metal or possibly a plastic material.

In the event that the structure 7 is made of plastic, the pivot 2, in addition to being in abutment with its abutment collar 4 on the upper bearing 5, is retained in the lower end part within a second lower bearing underneath the upper bearing, to be able to absorb and counteract the tilting moments of the pivot 2 due to its cantilevered arrangement with respect to the main axis of rotation X-X of the castor wheel 3.

The object of the invention consists of a plastic pivot 8 arranged with its o n rotation axis Z-Z orthogonal and cantilevered respect the main rotation axis 9 of the castor wheel.

In addition to the device of the invention, also the castor wheel and the relative pivot are made of a plastic/rubbery material, or other another resinous polymer.

Said pivot 8 has along its extension a collar 9 connected to it, which extends diametrically.

Both the pressure component of the weight above the equipment and the relative stresses of the tilting moments are transferred from said pivot 8 to said collar 9.

The weight and overturning moment are absorbed and countered by a ring nut 10 specially profiled with diameter dimensions corresponding to the above-mentioned collar 9.

Thanks to the extended surface, the specific localized pressure has modest local values.

However to make the movement of rotation of the pivot 8 around its axis Z-Z even more fluid, said ring 10 is expected to be made of an anti-friction and anti-wear material.

Even the stresses of the tilting moments turn out to be a low value, due to the considerable radial extension of the collar 9 and the respective ring nut 10.

Profitably the outer circumferential ends of the collar 9 and of the respective ring nut 10 are profiled with one or more series of coaxial lips 11, 12 that form a sort of labyrinth that prevents, or greatly restricts, dirt or the like getting in between the contact surfaces between the collar 9 and ring nut 10.

In order to make the fluidity of the rotation movement of the pivot 8 even more effective, all or part of the stresses are transmitted from the collar 9 to the ring nut 10 by means of a circumferential raised part 13 and relative hollow 14 arranged coaxially on the contact surface spaced from the axis Z-Z and preferably on the outermost radial part.

In this way both the pressure and above all the tilting moment are no longer transferred by contact on a flat surface but on a raised section 13 shaped in a curvilinear and preferably semi-circular manner that slides within a corresponding seat 14 profiled in a specular manner.

This avoids, in particular, that the stem 15 of the pivot 8 can creep inside the through-seat 16 of the ring nut 10, since the lateral displacements are restrained by the vertical fronts, or with a vertical component, internal and external (diametrically opposite to the axis), of the raised part 13 and countered by the vertical fronts, or with a vertical component, external and internal (diametrically opposite to the axis), of the recess 14.

All the above-mentioned stresses are transferred with specific small values, and in any event still admissible, by the ring nut 10 to the casing 17, since said ring nut 10 is housed in a first seat 18 on the top of the casing 17.

The lower part of the stem 15 of the pivot 8 after passing through the ring nut 10 and a hole 19 of the casing emerges in the inner part 17 of the casing.

Said lower part is retained by a flange 20, possibly by means of fastening elements, like for example a screw 21, to prevent unintended removal.

Moreover, said flange 20 contributes, with its enlargement and its supporting profile on a ring 22, housed in the inside part of the casing 17, in a second seat 23, in preventing the stem 15 of the pivot 8 from directly sliding against the housings of the ring nut 10 and the ring 22.

In fact, said flange 20 and the respective ring 22 are fitted in the facing areas with a raised part 24 and a corresponding hollow 25 whose vertical fronts, or with a vertical component, internal and external, prevent the tangential movement between the flange and ring and therefore prevent the stem 15 of the pivot 8 from coming into contact with the inner surface 26 of the through-hole of the ring.

It is obvious that this lower constraint between the flange and the ring contributes to the upper connection between the ring nut and the collar in maintaining the pivot in the axis, namely vertical, absorbing and countering the moments to which it is subjected.

We should finally add that the pivot 8 may itself be effectively an elastic device for retaining, after initial interference, within the corresponding seats of the equipment or device, possibly by tapering the top outside part and getting rid of the central core of the stem 15.

It has thus been seen that the new castor wheel, equipped with all the elements made of a non-metallic material, and preferably plastic and/or another resinous or rubbery polymer, obtains all the benefits of robustness of a similar metallic wheel without the associated drawbacks due to wear or magnetic field properties.

Related equipment or devices equipped with the wheels of the invention can therefore enter any premises, even those with limited or no electromagnetic interference without any danger of distorting diagnostic results or any serious consequences from a health viewpoint.

What is claimed is:

1. A pivot for rotation of a caster wheel for a cleaning appliance, the pivot including a stem of a protruding pivot made of a plastic/resinous material, the pivot being connected to a collar that rests on a ring nut made of wear-resistant material housed inside a first top seat of a casing, said pivot being held on a bottom by a flange that rests on a ring housed inside a second bottom seat of the casing.

2. The pivot of claim 1 wherein all or part of the vertical load of the pivot is transferred by means of the collar to the ring nut.

3. A pivot for rotation of a caster wheel for a cleaning appliance, the pivot including a stem of a protruding pivot made of a plastic/resinous material, the pivot being connected to a collar that rests on a ring nut made of wear-resistant material housed inside a first top seat of a casing, wherein the collar-ring nut pair has a circumferential raised part and respective hollow distanced from an axis of the pivot and on the outermost radial part of the collar-ring nut pair.

4. The pivot of claim 3 wherein the circumferential raised part and respective hollow have a vertical component capable of absorbing and resisting tilting moments and/or shifting of the pivot to prevent scraping thereof against a first top seat of the ring nut.

5. The pivot of claim 4 wherein said collar and said ring nut have one or more series of coaxial and concentric lips that create a labyrinth for preventing dirt from entering between the facing surfaces between the collar and the ring nut.

6. A pivot for rotation of a caster wheel for a cleaning appliance, the pivot including a stem of a protruding pivot made of a plastic/resinous material, the pivot being connected to a collar that rests on a ring nut made of wear-resistant material housed inside a first top seat of a casing, wherein a lower part of the stem of the pivot is held by a flange against an extension, wherein said flange has an extended surface that rests on a ring that is housed inside the casing in a second seat.

7. The pivot of claim 6 wherein the flange-ring pair has a circumferential raised part and respective hollow on its facing surface, distanced from an axis of the pivot and on the outermost radial part of said flange-ring pair.

8. The pivot of claim 7 wherein the circumferential raised part and respective hollow have a vertical component capable of absorbing and resisting tilting moments and/or shifting of the pivot to prevent scraping thereof against a first top seat of the ring nut.

9. The pivot of claim 6 wherein links between the ring nut and collar and links between the flange and the ring keep the pivot in a vertical position, an axis of the pivot capable of absorbing and countering the tilting moments to which the pivot is subjected.

10. The pivot of claim 9 wherein the pivot is entirely a non-metallic plastic, resin, or rubber polymer.

* * * * *